United States Patent [19]

Flodin

[11] 3,945,071
[45] Mar. 23, 1976

[54] APPARATUS FOR COLD FORMING RECESSES IN THE HEADS OF SCREW FASTENERS

[75] Inventor: Rodman C. Flodin, Mattapoisett, Mass.

[73] Assignee: Phillips Screw Company, Natick, Mass.

[22] Filed: Jan. 21, 1974

[21] Appl. No.: 435,217

[52] U.S. Cl............................................. 10/7; 10/26
[51] Int. Cl.²........................................... B23G 9/00
[58] Field of Search.......... 10/7, 10 R, 24, 26, 27 R, 10/53, 61, 70

[56] References Cited
UNITED STATES PATENTS

| | | | |
|---|---|---|---|
| 1,561,863 | 11/1925 | Kuhne | 10/26 |
| 2,165,424 | 7/1939 | Tomalis | 10/7 |
| 2,568,439 | 9/1951 | Friedman | 10/7 |
| 2,643,142 | 6/1953 | Stellin | 10/7 |
| 2,832,970 | 5/1958 | Carlson | 10/26 |
| 2,986,752 | 6/1961 | Lovisek | 10/7 |

*Primary Examiner*—C. W. Lanham
*Assistant Examiner*—E. M. Combs
*Attorney, Agent, or Firm*—Wolf, Greenfield & Sacks

[57] ABSTRACT

A recess is formed in a screw head by a cold forming technique employing a two piece punch which includes an outer member having an axial bore formed therethrough which receives and carries an inner, concentric punch pin for movement within the bore. The pin is mounted within the bore to have freedom of movement within certain limits. The forward end of the outer member has a surface or cavity shaped therein which corresponds to the general shape of the screw head to be formed and is large enough to accommodate the screw head when fully formed. The forward end of the punch pin has a nib formed thereon which is shaped to form the desired screw recess when impacted into the screw head. The pin is impacted into the screw head metal by driving it forwardly from its rear exposed end. The rear end of the pin presents a relatively small driving area disposed closely to the axis of the punch pin which reduces substantially resistance to the movement of the pin so that it may seek the path of least resistance through the metal during the cold forming procedure. The pin is withdrawn from the cold formed recess by engagement of a shoulder on the carrier with a cooperative shoulder on the pin. The shoulders engage along a relatively small area which is disposed closely to and symmetrically about the axis of the pin to enable the pin to move about and seek the path of least resistance during withdrawal.

16 Claims, 19 Drawing Figures

APPARATUS FOR COLD FORMING RECESSES IN THE HEADS OF SCREW FASTENERS

BACKGROUND OF THE INVENTION

This invention relates to the fabrication of recessed screw heads and, particularly, screw heads of the type which are commonly cold formed on two-blow header machines. These machines typically include a die which rigidly holds a pre-cut length of wire stock while a first punch is impacted against an end of the wire blank to partially form the head and define an "upset". With the upset still held firmly in the die a second finishing punch is brought into axial alignment with the upset and is then impacted axially into the upset bloom of the blank. The finishing punch commonly in use is of one piece, unitary construction having a central forwardly projecting nib shaped to form the recess upon impact. The forward surface of the punch which surrounds the nib defines the shape of the screw head. The one piece punch typically is held rigid as it is impacted into the upset bloom. The use of the one piece unitary finishing punch in the second blow of the two blow heading operation presents a number of difficulties.

Among these difficulties is that the one piece finishing punch has but a relatively short life. It is not uncommon for a punch to become damaged or severly worn after having formed between ten thousand and twenty thousand screw heads. Where heading machines of the type described often have a capacity of up to three hundred screw heads per minute, the punch frequently becomes unusable after only a few hours of operation. This requires interruption of the header on numerous occasions in a single day to enable the punch to be replaced. The down time of the header is sometimes considerable in that even after the punch is replaced, the various parts of the heading machine may have to be realigned and/or readjusted. Further, in typical screw manufacturing factories where many such heading machines are operating simultaneously, it is sometimes difficult to detect when a particular punch on a particular header has become defective and is ready for replacement. Failure to detect a faulty punch in time may result in a high rate of product rejection because the screws formed by the faulty punch will necessarily be of substandard quality.

The above difficulties are amplified when making certain types of screw recesses. For example, where the screw recess is one having a number of grooves and faces formed to receive a specially shaped driver, the punch nib must be formed to define complementary surfaces. By way of example, one such recess and one piece finishing punch therefor is shown in U.S. Pat. No. 3,108,623. The punch nib employed to cold form such a recess necessarily has numerous relatively sharp edges which are easily subject to wear and which form high stress regions which may tend to fracture or deform during the heading process.

The above problems inherent in one piece finishing punches are believed to be due, at least in part, to defects and irregularities in the wire stock from which screws are formed. It is believed that the irregularities may present variable resistance to the cold flow of metal in different parts of the screw head being formed. The existence of irregular, hard regions within the metal of the upset bloom may also cause uneven wear on certain regions of the punch nib which, in turn, may result in increasing the stress imposed on certain parts of the punch nib, resulting in premature failure of the punch. Further, it sometimes occurs that the upset bloom formed by the first blow in the heading operation is asymetrical so that even if the second punch is moved into alignment with the axis of screw blank, the punch nib will not engage the upset bloom symmetrically in its center. This too can impose excessive stresses in the nib which may accelerate early failure.

In addition to the above difficulties, there is evidence that, when using a one piece punch, even where a screw head having an externally satisfactory appearance has been formed, the flow of metal within the screw head often is not uniform but may include hidden cracks and defects which weaken the structure of the screw. Further defects often encountered with screws having a number of substantially radial grooves defining the screw recess is that the critical surfaces and walls of the screw recess often do not conform to the configuration of the corresponding surfaces of the punch nib which form the walls. This is sometimes referred to as "fallaway" and a screw recess having significant fallaway cannot be driven with the same effectiveness as one which has less or no fallaway.

Many efforts have been made to avoid the foregoing difficulties and numerous suggestions have been propesed over a greater number of years. None have succeeded as evidenced by the fact that the one piece finishing punch still is in substantially widespread, universal use.

It has been suggested that many of the foregoing problems of one piece finishing punches could be relieved by employing a punch which could move to follow the fefects in the screw blank or the misalignments of the punch with the screw heads. Typical of such devices are those described in U.S. Pat. Nos. 2,082,085, 2,568,439, 2,643,142 and 2,986,752. In practice, these devices have failed. After a relatively few number of header impacts, they have become jammed and have been unable to shift about to follow the path of least resistance through the upset bloom to conform to metal defects, or other misalignments. Thus, although the proposed solution of mounting the punch for shifting movement has been known in theory for some time, no practical operative device has been developed.

It may be noted tht the recessed screw art has had a number of proposals relating to specifically formed recesses in which the walls of the recess are undercut to more effectively lock the driver to the screw head. One such proposed recess is described in U.S. Pat. No. 2,800,829 to West. That recess, could not be made in a two blow cold-forming process because there was simply no known way to form the undercut wall. In U.S. Pat. No. 2,986,752 to Lovisek a punch and method was described and was stated to set forth a workable method for making the West recess. That punch, however, sufferend from the same defects as the other one piece punches discussed above in that after a few strokes of the header, the punch would bind and would be incapable of shifting and moving about in the manner suggested by the patent.

Also among the difficulties encountered with typical prior art punches is the tendency for the cold-formed screw to stick to the nib of the punch and to be withdrawn from the die as the punch is retracted. This tends to occur more often with shorter screws which cannot be held tightly enough in the die to enable the nib of the punch to be separated from the recess. When this occurs and the punch is operated in the next cycle to form a subsequent recess, the previously formed screw which remains firmly attached to the punch nib can cause failure of the punch nib and can otherwise damage the machine.

It is among the primary objects of my invention to provide a method for forming recesses and a punch therefor which overcomes the foregoing as well as other difficulties described herein.

SUMMARY OF THE INVENTION

The invention includes a specially formed two piece punch which is employed in the recess-forming second blow of the twoblow header. The punch includes an outer cylindrical member, or carrier, which is mounted for axial sliding movement in the header ram and which has a forward end shaped generally to define the contour of the screw head. The carrier is movable axially within the ram and is biased forwardly under a spring force. The carrier includes an axial bore, open at both its forward and rearward ends. The punch includes a punch pin which extends through the axial bore of the carrier. The forward end of the punch pin is formed to define the recess-forming nib. The punch pin, as measured from its rearward end to the tip of the nib is longer than the axial bore in the carrier and is dimensioned so that when the rear end of the punch pin is in alignment with the rear end of the carrier, the nib extends beyond the forward end of the bore by an amount which is at least substantially equal to the intended depth of the recess to be formed.

The punch pin is mounted somewhat loosely within the carrier bore and is able to rotate, cant and move longitudinally within the bore so that it may have some limited universal movement. In operation the punch is advanced axially toward the upset bloom to cause the carrier to engage and embrace the upset bloom. As the ram continues its forward movement the carrier is urged against the upset bloom under the force of the spring. The punch pin is in a rearward position in the bore at this time with its rearward end protruding rearwardly of the rear surface of the carrier. As the ram continues its forward movement an impact plug, carried by the ram behind the punch engages the rear end of the pin and drives the pin into the upset bloom to cold form the recess in the bloom. As the metal in the head flows generally radially outwardly of the screw in response to the impact of the punch nib, the radial expansion is not significantly resisted by the carrier which, if necessary, can move rearwardly against the force of the spring. The ram continues its advancement until the rear ends of the pin and carrier are in alignment. The ram is then in its most forward position (top dead center) and then begins its retraction stroke to withdraw the finishing punch and enable the screw to be ejected.

The impacting surface at the rear end of the punch pin is of relatively small diameter, as compared to the diameter of the carrier and is disposed symmetrically about the longitudinal axis of the punch pin. This reduces the resistance of the punch pin to rotation or canting and enhances the ability of the punch pin to assume an attitude in which it may seek the path of least resistance through the metal of the upset bloom.

A further feature of the invention resides in the ability of the pin to rotate with minimal resistance, particularly as it is withdrawn from the screw head. The rearward end of the pin is of slightly larger diameter than its more forward portions with their juncture being defined by a conical shoulder. The carrier bore has similar mating surfaces. When the punch is retracted, the carrier first withdraws from the screw head with the punch pin remaining embedded in the formed recess. When the shoulder in the bore engages the shoulder of the punch, the punch pin is withdrawn. The only region of contact during the withdrawal, between the carrier and the punch pin is that relatively samll area, close to the axis of the punch pin, defined at the abutting shoulder surfaces of the bore and pin which presents minimal torque resistance to rotation of the pin during withdrawal. This enables screw recesses having undercut driving walls, as the type shown in the aforementioned West patent to be made without the punch destroying the undercut recess walls. On withdrawal of the punch from the West-type recess, the pin can rotate to leave the undercut walls substantially intact.

A further aspect of the invention relates to an improved arrangement to inssure that the nib of the punch pin withdraws from the formed recess and does not remain embedded in the recess which might cause the headed screw to be pulled out of the die and remain stuck to the punch nib. As mentioned above, this has been a problem of particular importance with regard to the heading of relatively short scrws which sometimes are not gripped by the die under a sufficient force to enable the withdrawal of the punch nib from the recess. In this aspect of the invention, means are provided to bias the punch pin rearwardly with respect to the carrier while simultaneously urging the carrier forwardly against the screw head. The rearward biasing force imparted to the punch pin is sufficient to cause withdrawal of the nib from the formed recess.

It is among the primary objects of the invention to provide an improved punch and method for cold heading fasteners having recesses in which the punch has a significantly improved life.

Another object of the invention is to provide an improved punch which enables the cold forming of fasteners having recesses with undercut walls formed therein.

Another object of the invention is to provide an improved punching method and apparatus which forms more accurate recesses and which minimizes fallaway in such recesses.

A further object of the invention is to provide a cold heading punch which is less costly to replace.

Another object of the invention is to provide a two piece punch in which the punch nib may be formed froma a harder material than that from which the other punch surfaces are made.

Still another object of the invention is to provide an improved cold heading method and punch therefor which has the ability to conform to irregularities in the upset bloom without binding.

A further object of the invention is to provide a two piece punch in which substantially all of the force of the header ram is applied to forming the recess.

A further object of the invention is to provide an improved header punch in which resistance to radial flow of the screw head metal is reduced materially as the recess is formed.

A further object of the invention is to provide an improved punch which insures withdrawal of the punch nib from the formed recess regardless of the length of the screw.

DESCRIPTION OF THE DRAWINGS

The foregoing and other objects and advantages of the invention will be appreciated more fully from the following further description thereof, with reference to the acompanying drawings wherein.

DESCRIPTION OF THE PREFERRED EMBODIMENT

The invention is employed in a conventional two-blow header machine. Such machines have been and are in widespread use for cold heading screw heads and are well-known to those skilled in the art. Accordingly, the various parts and operating instrumentalities of the header will be described herein substantially only to an extent sufficient to illustrate the invention.

Figures 1, 2, 3, 4, 5:
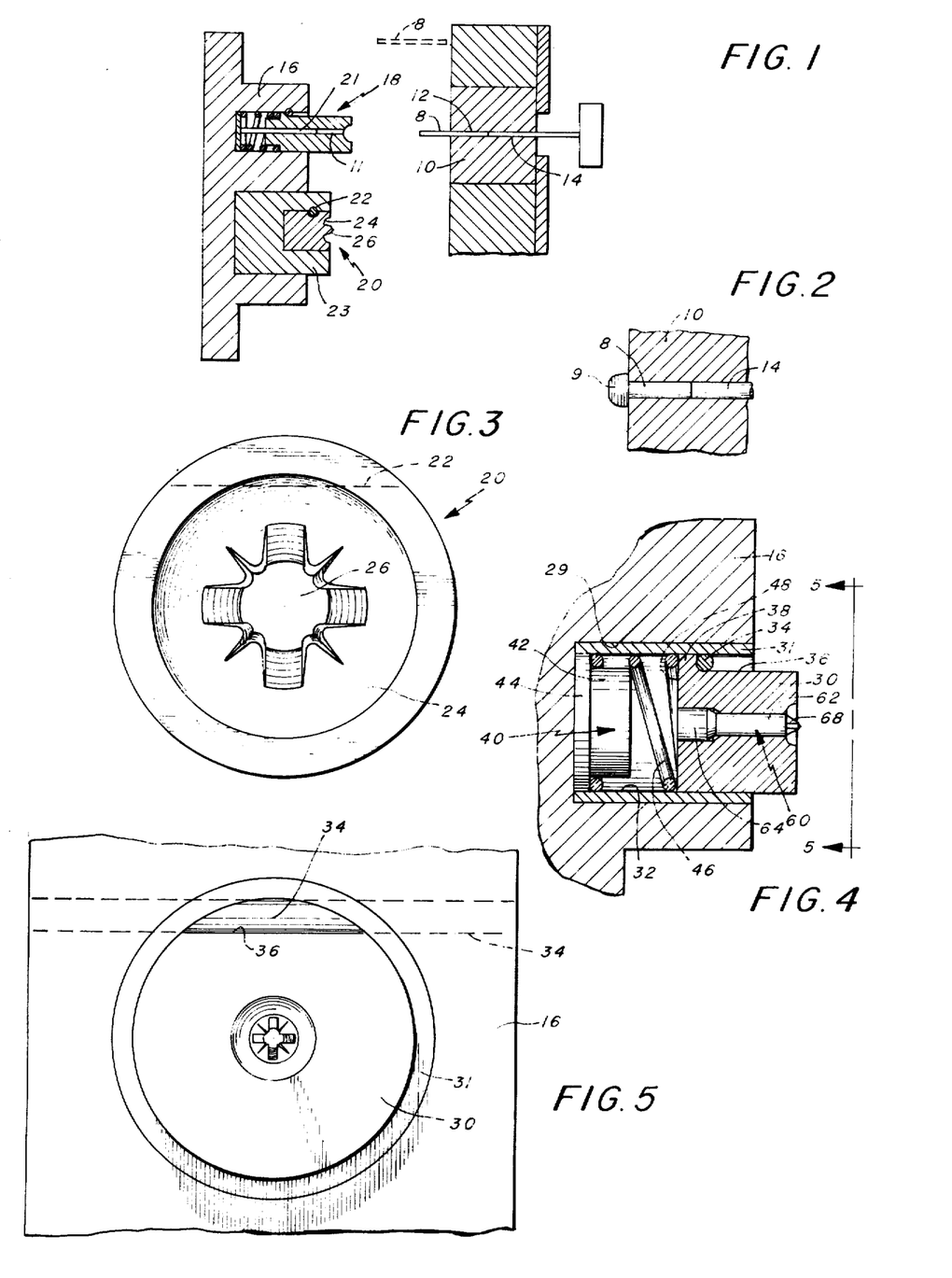
FIG. 1 is a simplified illustration of those portions of a two blow header with which the invention is used and showing a one piece finishing punch.
FIG. 2 is an enlaged illustration of the upset having a blow formed thereon after the first blow of the header.
FIG. 3 is an illustration of a one piece finishing punch as seen from its front end and along its axis.
FIG. 4 is a sectional illustration of the punch of the invention.
FIG. 5 is a front view of the punch as seen along the line 5—5 of FIG. 4.

The two blow header typically includes cutting and feeding mechanisms (not shown) for cutting a blank 8 of wire to a predetermined length and then feeding the cut blank to a stationary die 10 as shown in FIG. 1. The die 10 includes a die hole 12 into which an end of the blank is inserted to a depth determined by a knockout pin 14. During the heading operation the knockout pin 14 is fixed in place, as in the position shown so that when the blank is disposed within the die hole 12, an end of the blank will protrude outwardly beyond the face of the die to a predetermined extent. After the heading operation is completed the knockout pin 14 is driven through the die hole 12 to eject the headed blank to enable the die to receive the next blank.

The header includes a ram 16 which is mounted in the machine for reciprocating movement toward and away from the die and for transverse movement. The ram 16 carries an upset punch, indicated generally by the reference character 18 and a recess forming or finishing punch, indicated generally by the reference character 20. In the first blow of the header the ram is positioned with its upset punch 18 in axial alignment with the blank held in the die 10 and is driven forwardly to upset the end of the blank and form the upset bloom 9 as shown in FIG. 2. The upset punch may take any of a variety of forms such as that suggested in FIG. 1 in which the punch is slidable longitudinally within the ram and is biased forwardly by a spring. The punch has a central hole 11 which, when the punch is advanced axially toward the blank receives the blank. Continued forward movement of the ram causes a rod 21 to force the enclosed portion of the blank into the enclosed cavity defined between the punch 18 and the face of the die 10. A further description of this general type of upset punch may be found in U.S. Pat. No. 2,165,424 to Tomalis. The particular configuration of the bloom may vary somewhat, depending on the type of screw and screw head shape being made. While FIG. 2 shows an upset which might be employed to form a pan head screw, the upset shape for a countersunk screw would, of course, be somewhat different in that the die would have a suitable conically shaped recess surrounding the die hole 12.

After the first blow has been completed and the upset formed, the ram then retracts from the die and moves tranversely to bring the finishing punch 20 into axial alignment with the upset. The ram 16 then is driven forward in a second blow to impact the upset bloom thus shaping the head of the screw and forming the recess by which the screw may be driven.

FIGS. 1 and 3 show the typical one piece finishing punch which is in substantially universal use throughout the screw manufacturing industry. The punch is of cylindrical shape and may be mounted securely in an adaptor 23, by a pin and slot arrangement 22 with its forward end protruding outwardly from the ram 16. The forward face of the punch is contoured to generally define the shape of the head of the screw to be made, such as depression 24 defining the pan head shown. Located centrally at the forward face of the punch is an integral punch nib 26 which is shaped to form the desired recess in the screw when impacted against the upset bloom.

FIGS. 4–7 show the structure of my improved punch which includes an outer cylindrical member or carrier 30 which is mounted for axial sliding movement within a bore 32 of a sleeve 31 secured within a hole 29 in the ram 16. Means are provided to limit the extent to which the carrier 30 may protrude outwardly of the bore 32 such as the pin 34 which extends through receptive holes in the sleeve 31 and ram 16 and which is engaged by a lip 38, defined at the rearward end of the carrier 30. A flat 36 is formed on the outer surface of the carrier 30 to enable the carrier to slide within the sleeve. The hole 29 receives an impact plug 40 at its inner end. The impact plug 40 may include a forwardly extending central portion 42, smaller in diameter than the bore 32 and a rearward, enlarged flange 44. A compression spring 46 surrounds the central portion 42 of the plug 40 and extends between the flange 44 and the rear face 48 of the carrier 30.

Figure 6:
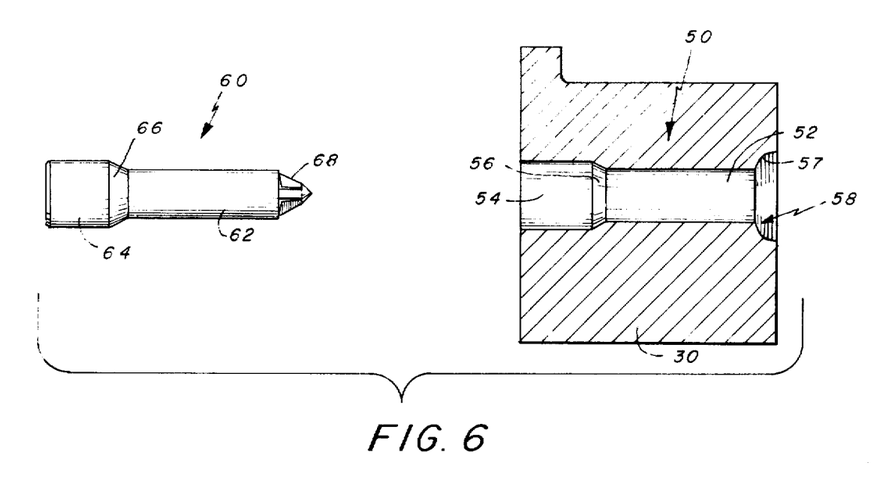
FIG. 6 is an illustration of the carrier and punch pin separated to show their respective parts more clearly.

As shown more fully in the enlarged FIG. 6, the carrier 30 includes an axial bore 50 which extends fully therethrough. The bore 50 includes a forward portion 52 which is of smaller diameter than its more rearward portion 54. Forward and rearward portions 52, 54 are joined by a stepped portion 56 which may be generally conical as shown. The forward face of the carrier 30 is shaped, in the illustrated embodiment, to define a concave depression 57 in the general shape of the screw head, such as the pan head shaped cavity 58 shown. The cavity 58 is located along the central axis of the former and the forward portion 52 of the former bore 50 opens into the center of the cavity 58. As will be described more fully below, the depression 57 has no significant effect on the final shape of the screw head. It should be sufficiently large to enable the cold flowing metal of the upset bloom to flow to the final head shape which depends in large part on the shape of the upset bloom which was formed in the first blow of the header.

Figure 7:
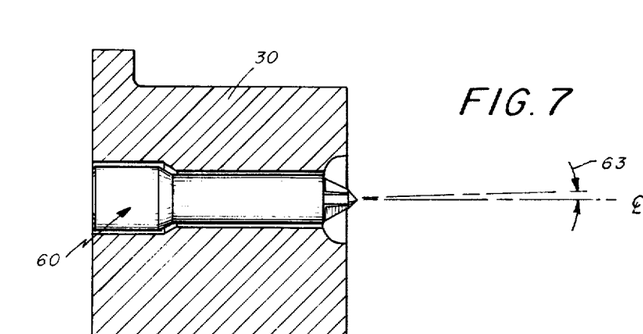
FIG. 7 is an exaggerated illustration of the manner in which the punch pin may cant within the former bore.
Figure 8:
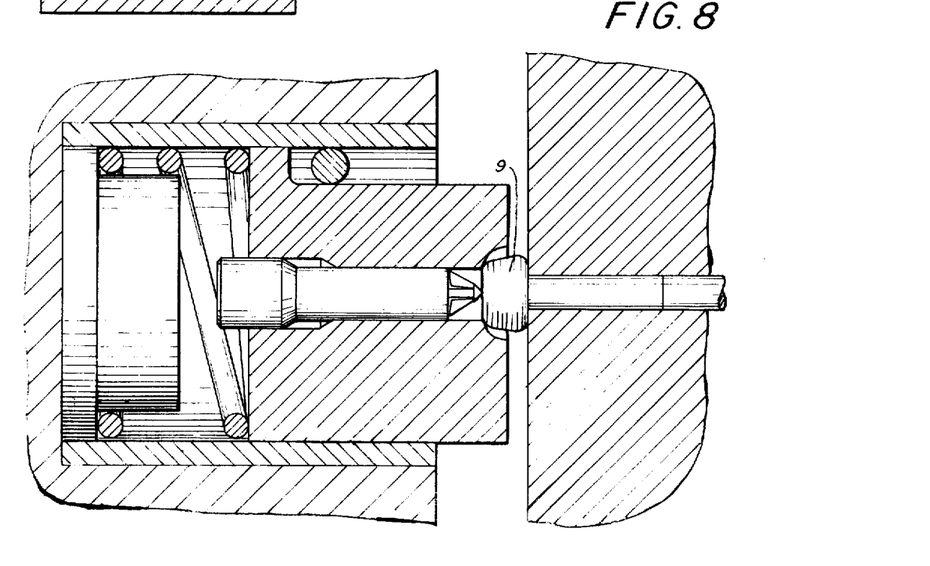
FIGS. 8–11 are sequential illustrations of the invention while cold forming a pan head screw.
Figure 9:
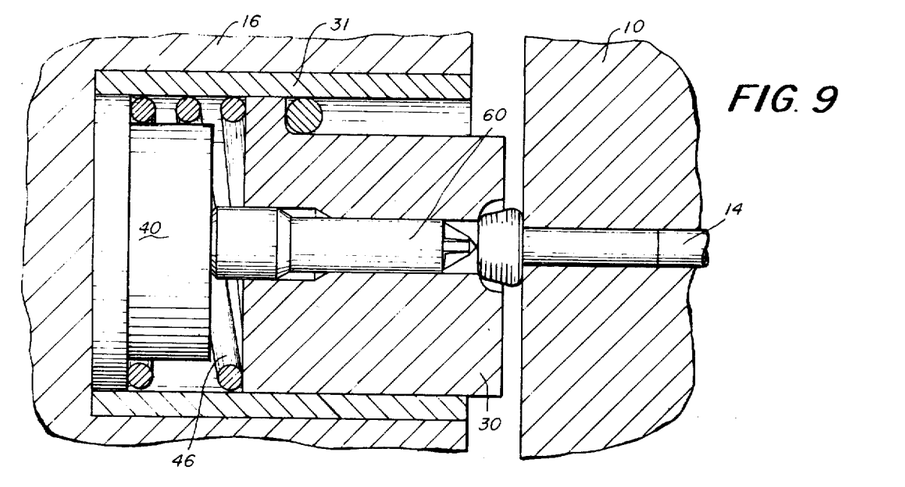

The carrier bore 52 receives a punch pin 60 which similarly has a forward portion 62 smaller in diameter than the more rearward portion 64 of the punch pin 60. The forward and rearward portions 62, 64 of the pin 60 are joined by the stepped portion 66. The punch pin 60 is disposed in the carrier bore 50 with the forward portion 62 of the pin slidable within the forward portion 52 of the bore and the rearward portion 64 of the pin in the rearward portion 54 of the bore. The pin 60 fits within the bore 50 somewhat loosely to enable the pin 60 to have a limited degree of universal movement so that the pin may move and shift about as described more fully herein. For example, the diameters of the forward and rearward portions of the punch pin are slightly less than the corresponding diameters of the former bore 50. The diametral clearance may be, for example, the order of 0.003 to 0.010 inches. The dimensional clearance between the punch pin 60 and the carrier bore may be varied and should be of a magnitude which will enable the pin to assume a canted attitude in which the axis of the pin is disposed at a slight angle 63 to the axis of the bore 50. FIG. 7 shows the manner in which the pin may cant within the bore but to an exaggerated extent for ease of illustration. The rearward end of the punch pin 60 is of substantially smaller diameter than that of the carrier 30 and it is preferred to make the impacting surface area defined at the rear end of the punch pin as small as structurally possible for reasons described more fully below. In general, the rear end of the punch pin should define a diameter which is at least as small as the diameter of the screw head being formed.

The recess-forming nib is formed at the forward end of the punch pin. The length of the punch pin 60 is such that when the rear end of the punch pin is in line with the rear face 48 of the former 30, the nib 68 will protrude forwardly beyond the forward end of the bore 52 an amount equal to the intended depth of the recess to be formed in the screw head.

Figure 10:
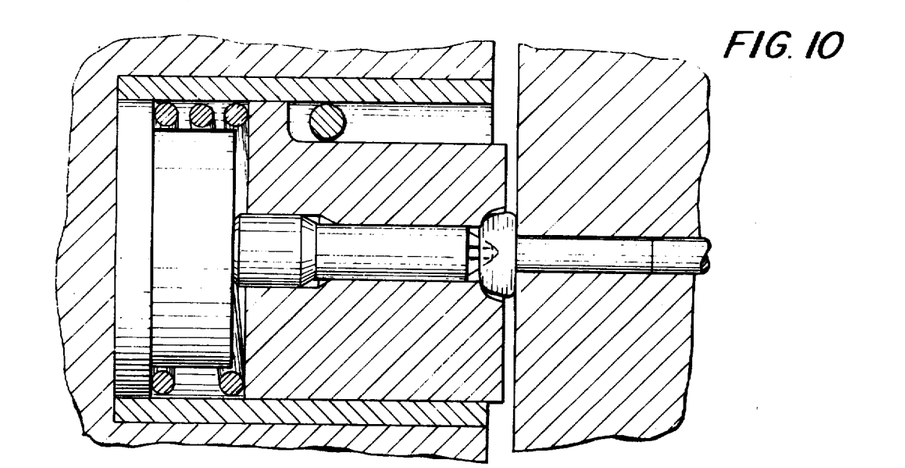

The operation of the invention may be seen from sequential FIGS. 8–11. After the upset bloom 9 has been formed by the upset punch in the first blow of the header, the ram is then shifted transversely to bring the finishing punch into axial alignment with the axis of the upset. The ram then is driven forwardly. At this time the carrier 30 is biased in its fully forward position by the compression spring 46. The punch pin 60 may be disposed within the bore 50 anywhere between its forward and rearward limits as determined by the stepped portion 66 and the impact plug. As the finishing punch impacts against the upset bloom the nib of the punch pin 60, which at this time is freely movable within the former bore 50 will be urged rearwardly into the bore in the event that the nib was protruding into the concave depression at the time the former 30 engaged the upset bloom. The dimensions of the ram bore, plug, punch pin 60 and carrier 30 should be such that the plug will remain spaced from the rearward end of the punch pin at this time as suggested in FIG. 8. The engagement of the carrier 30 with the upset bloom terminates further forward movement of the carrier 30 and the carrier 30 is urged against the upset bloom under the influence of the compression spring 46. As the ram 16 continues its forward advancement the plug 40 engages the rearward end of the punch pin (FIG. 9) which, at this time is protruding rearwardly out of the carrier bore 50. The continued forward movement of the ram drives the pin 60 forwardly to impact its nib into the upset bloom and cold form the recess. As the nib advances into and through the upset bloom the metal of the bloom is displaced generally radially and outwardly of the axis of the upset and also partially in a forward direction which reduces the height of the bloom to the intended height of the finished screw head (FIG. 10). During this flow of metal the carrier is not forced against the flowing metal of the upset bloom under a force sufficient to effect any significant cold forming itself but instead bears against the metal of the bloom only under the relatively light force of the compression spring. In this manner the carrier does not interfere with the smooth flow of the metal. The final shape of the head of the screw is determined in large measure by the shape of the upset bloom formed in the first header blow. Different intended final head shapes thus will require the use of upset punches having cavities of different shapes to form upset blooms which, when impacted by the punch pin will tend to flow naturally to the final head configuration without any significant cold-forming applied to the peripheral regions on the upset bloom. The foregoing mode of operation may be contrasted with the typical one piece, unitary punch in which the nib and head-defining region of the forward face of the punch both are intended to contribute significantly to the cold forming of the head. The one piece punch first engages the upset bloom with its nib only. The forward face of the punch continues to advance forwardly in unison with the nib while the metal of the bloom flows outwardly and radially. Well before the header has reached dead center (its forwardmost position) the radially flowing metal engages the forwardly advancing head-defining portion of the forward face of the punch which resists the radially outward cold flow. Thus, with the one piece punch opposing forces are generated which disrupt smooth flow of the metal. It is believed that this may be a contributing factor to formation of hidden fractures in screw heads manufactured with the one piece punch.

Figure 11:
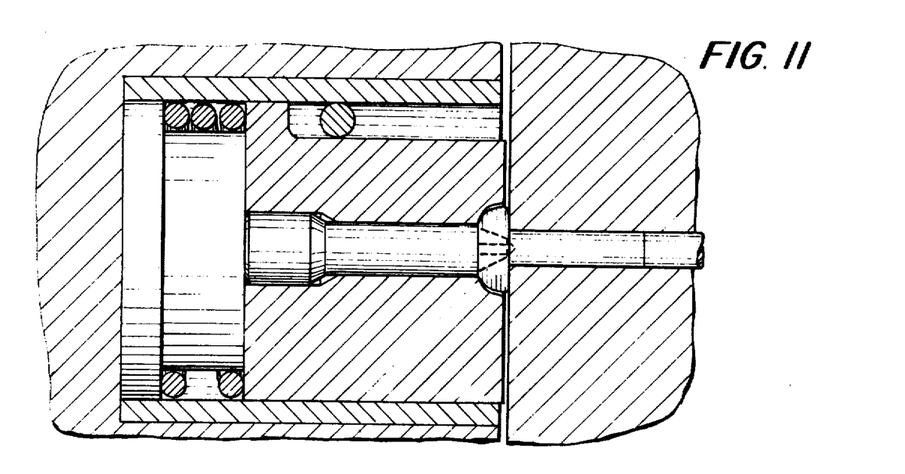

The various parts of the finishing punch are dimensioned in relation to the length of the reciprocating stroke of the header and the particular size and shape of screw head to be formed so that when the ram has moved to its forwardmost position (top dead center) the rear end of the pin 60 and rear surface of the carrier 30 are in alignment with each other and the nib of the pin 60 extends beyond the end of the former bore 50 and into the screw head to the desired penetration depth (FIG. 11).

The device employs a technique in which, when the nib first contacts the upset bloom, the pin is held primarily between the upset bloom and the plug 40 which is in engagement with and urges the rear end of the pin 60 forward. One of the features of the invention is that the surface area defined at the rear end of the pin 60 at which the plug contacts the pin is kept to a minimum.

Thus, once the plug has driven the pin into contact with the upset bloom the pin is held primarily by the generally axial forces thus developed. Because the nib and the rear end of the pin are in endwise contact at the small areas defined above and because the pin is disposed within the bore to have a limited degree of universal freedom of motion, there is substantially no significant resistance to the pin shifting about, within the limits, to seek the path of least resistance as it is forced through the upset bloom. In this regard, the present invention is to be contrasted with the typical one piece prior art punch in which the rear surface of the punch, by which it is driven forwardly into the upset bloom is broad which retards the ability of the punch to shift about, even if the punch is otherwise mounted for limited universal movement.

It should be noted that there may be some instances where it may be desirable to enable the forward face of the carrier to be impacted very slightly against the screw head when the machine is at top dead center. This may be desirable in order to slightly round a corner which might result on the screw head from the cold-flowing solely in response to impacting of the punch pin and it is primarily a finishing step for cosmetic purposes. When this technique is employed the carrier need only be impacted against the formed screw head for perhaps a few thousandths of an inch before the header reaches top dead center. The carrier thus effects no significant cold-forming of the screw head but does impart a slight finishing and smoothing of the screw head. Whether the device employs this mode of operation depends on the relative length of the punch pin and the carrier which can be adjusted, for example, by substituting an impact plug which is slightly thicker by approximately a few thousandths of an inch. Alternatively, a shim of that thickness may be inserted between the back of the impact plug and the bore 29.

Figure 12:
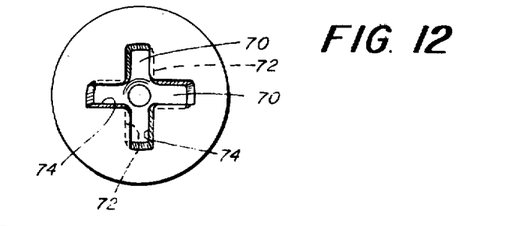
FIG. 12 is a plan view of the West type of recess.

As mentioned previously, one of the features of the invention is that it also provides a practical method and apparatus for the fabrication of the type of recess shown in West Pat. No. 2,800,829. That recess is shown, somewhat diagrammatically in FIG. 12 from which it may be seen that it includes a plurality of radially extending slots 70, each slot having a leading or driving wall 72 and a lagging or backout wall 74. The leading wall of each of the slots is undercut and is inclined to the vertical at an angle of up to about 5°. It is intended to be used with a substantially complementary driver having wings which are similarily inclined so that they may engage the undercut surface of the leading walls. As described more fully in U.S. Pat. No. 2,986,752 to Lovisek, there has been no practical way to cold form this type of recess. While the Lovisek patent suggests a technique for fabricating the recess, that technique has not proved to be commercially acceptable. The primary difficulty is believed to relate to the inability of the punch to rotate when withdrawn from the cold formed recess which without rotating, tends to tear out the undercut driving wall. With my invention, the resistance to rotation of the punch pin during withdrawal is substantially minimized and the punch pin is more easily rotated when withdrawn. During withdrawal, the shoulder regions of the carrier bore and punch pin engage at their mating surfaces so that rearward movement of the carrier will draw the punch pin rearwardly out of the recess. The area of contact between the shoulders of the punch pin and carrier bore are very small and are synmetrically located very close to and about the axis of the punch pin thus imposing very little resisting torque. The punch pin can rotate easily as its wings slide along the undercut walls of the recess.

Figure 13:
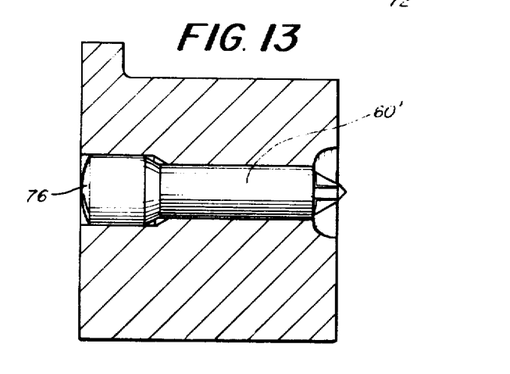
FIG. 13, 13A and 13B are illustrations of modified forms of the invention.
Figure 13A:
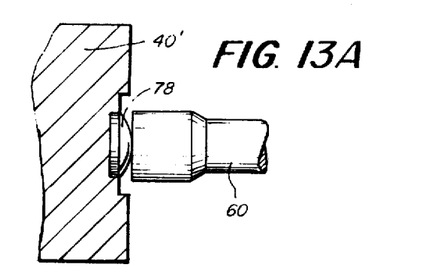
Figure 13B:
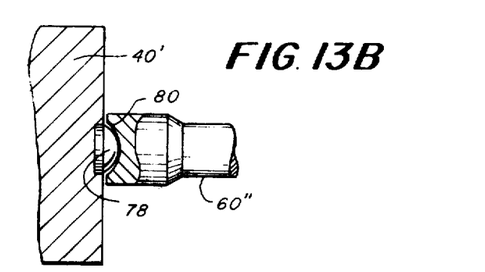

FIG. 13 shows a modified form of the invention in which the area of contact between the rear end of the pin and the plug is still further reduced. Here, the rear end 76 of the pin 60' is rounded to minimize the area of contact between the pin and the plug 40' to almost a point-like region. Alternatively, the plug 40' may include a hardened spherical or other suitable convex surface 78 which may engage the rear end of the pin and, in this modification, the rear end of the pin may be flat (FIG. 13A) or convex as shown at 80 in FIG. 13B.

Figure 14:
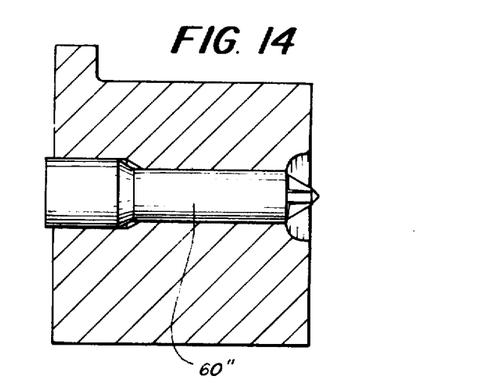
FIG. 14 is an illustration of a further modification of the invention.

In some instances it may be desirable to modify the invention slightly to insure that the plug does not engage and drive the former forwardly to contribute materially to the cold-forming process. This modification is shown in FIG. 14 in which the punch pin 60'' is slightly longer than the device previously described. Here, with the header machine set up so that the slightly longer punch will still engage the bloom only to the desired penetration depth, when the ram is at top dead center, the rear face of the former 30 will still be slightly forward of the rear end of the punch so that the plug never does engage the former 30. This insures that, at all times, the former will be urged forwardly only under the relatively light force of the spring.

Figure 15:
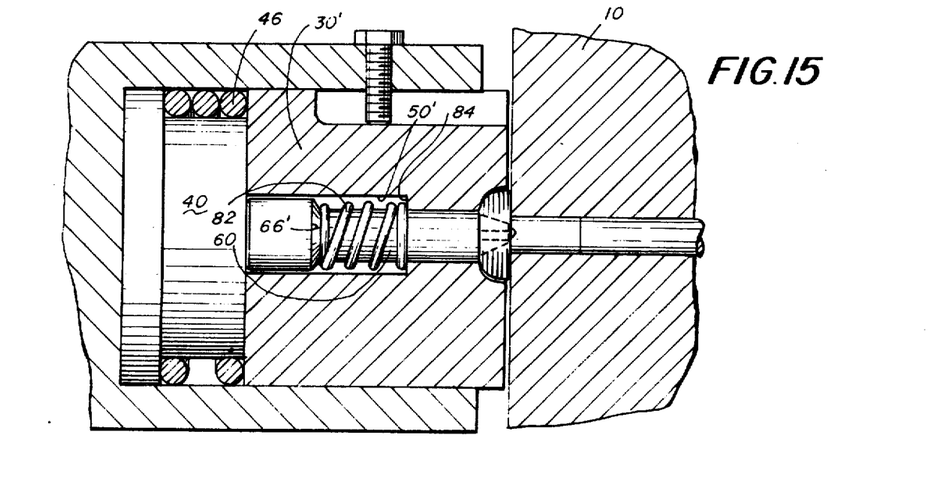
FIG. 15 is an illustration of a modified form of punch mechanism shown at top dead center as the screw head is formed fully.
Figure 16:
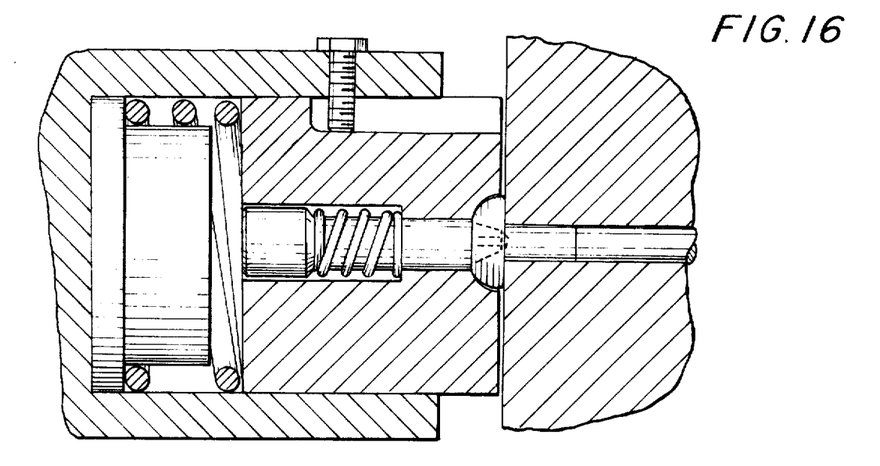
FIG. 16 is an illustration of the punch mechanism shown in FIG. 15 after the ram has partially retracted showing the tendency of the punch nib to remain embedded in the formed screw recess.
Figure 17:
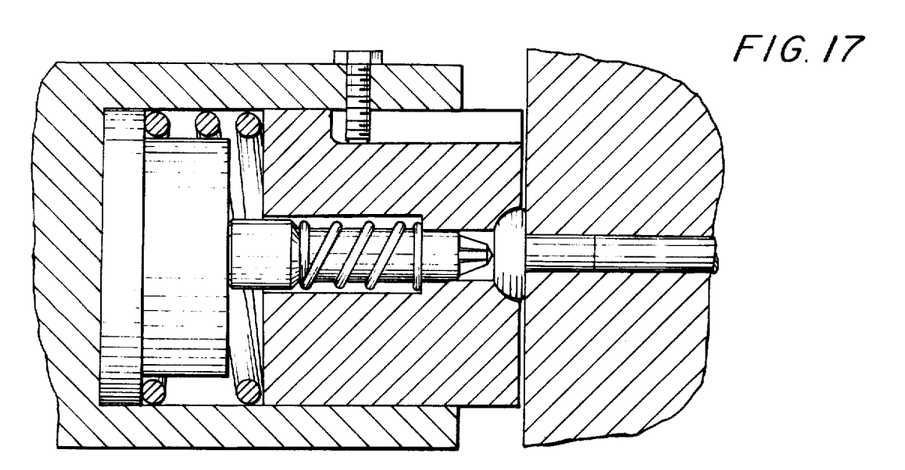
FIG. 17 is an illustration of the punch shown in FIGS. 15 and 16 illustrating the manner in which the punch pin is biased out of embedment from the screw recess.

FIGS. 15–17 show a modification of the invention which is adapted for use in the manufacture of relatively short screws or other screws which might tend to be pulled from the die by the embedded nib of the punch as the punch is retracted from the die. It should be noted that the screw usually is retained firmly within the die after the first upset blow which causes some radial expansion of that portion of the blank which is in the die hole and which secures the blank in the die hole under a force which is at least strong enough to enable the embedded punch nib to be withdrawn from the formed-recess. However, in the case of short screws the gripping force between the blank and the die hole may not be sufficient and in this case, with the punch nib sufficiently and firmly embedded in the recess, the screw can sometimes be pulled out of the die and may remain attached to the nib. As mentioned previously, when the finishing punch is thereafter urged forwardly toward the die, the still attached screw can result in significant damage to parts of the machine. My invention may be modified to incorporate means which insure that the screw will remain in the die as the nib is retracted from the formed recess. As shown in FIGS. 15–17, a compression spring 82 is disposed about the punch pin 60 between the stepped shoulder 66' and the rearwardly facing shoulder 84 in the carrier bore 50'. When the parts are in the configuration shown in FIG. 15, with the ram fully forward at top dead center and the nib of the pin having fully formed the recess and being embedded therein, the compression spring 82 is compressed. As the ram then begins its retraction rearwardly and away from the die, the impact plug 40 will separate from the rear end of the punch pin 60. The carrier 30' will remain biased forwardly against the formed screw head because the compression spring 46 is still somewhat compressed. As soon as the impact plug 40 separates from the rear end of the punch pin, the force of the spring 82 is applied fully to the punch pin to urge it rearwardly with respect to the carrier 30'. Spring 82 is selected so that when compressed, when the header is at top dead center, it will develop sufficient force to pull the nib of the punch pin out of the recess formed in the screw. The pin 60 snaps back under the influence of the spring 80 and against the face of the plug 40. The spring 82 should be selected so that it develops a force sufficient to withdraw the nib from the screw head yet which is less than the force of the spring 46 which urges the carrier forwardly and firmly against the screw head. Thus, as the ram retracts the carrier 30' retains the head of the screw while spring 82 draws the pin 60 out of the recess. In this embodiment it should be noted that the pin 60 is not hindered in its ability to shift and move about with respect to the carrier and the screw head as described above. The rearwardmost coil of the spring 82 preferably engages the stepped portion 66 of the pin in a narrow area symmetrically about the axis of the pin so as not to adversely affect the ability of the pin to rotate freely and easily as it is withdrawn from the formed-recess. As shown, the rear end of the carrier bore 50' may be enlarged or otherwise modified, as desired, to accommodate the spring 82.

My punch also achieves other advantages which result from its structure. Because the portion of the punch carrying the nib and the portion which generally defines the shape of the head are carried by the separate pieces, fabrication of the punch pin and its integral nib is less costly and easier than fabrication of a complete one piece integral punch. It may be noted in this regard that the head shape defining surface of the typical punch has no sharp corners and edges and is not subject to significant wear. In contrast, the nib is the critical portion of the punch and, as described above it wears very rapidly. My invention enables the nib portion of the punch assembly to be changed simply by replacing the punch pin. Further, because of the separate two piece construction of the finishing punch, the punch pin, including the nib which it carried may be formed from a harder material than the former which would make the punch nib more durable.

A further advantage of the invention is that it tends to have a self-cleaning effect. This is believed to be due to the fact that the pin is freely slidable within the bore. In this regard it should be noted that the metal wire from which the screws are made usually is coated with rust resistant films and/or other coatings which serve as a lubricant to enable the wire to be fed easily through the header die. It is not uncommon for header operators to oil the wire before it is fed into the machine. These various coatings and oil films can build up on the standard one piece punch and its various supporting mechanisms which can have an adverse effect on the operation of the punch as well as its useful life. Entrapment of these materials, and dust which they may attract is believed to be a contributing factor to the failure of the prior proposed "movable" punches described above. In contrast, my improved punch does not seem to be adversely affected by these foreign, but necessary materials.

It should be understood that the foregoing description of the invention is intended merely to be illustrative thereof and that other modifications and embodiments may be apparent to those skilled in the art without departing from its spirit.

I claim:

1. A finishing punch for cold forming a recessed head in the upset end of a screw blank in a multiple-blow header machine comprising:

an elongate punch pin having a recess-forming nib at its forward end, the nib including a plurality of wings radiating therefrom for forming a similarly shaped driver-receptive recess, the rear end of the punch pin defining an impact surface which is symmetrically disposed about the longitudinal axis of said pin, the impact surface defining an area not substantially greater than that defined by the diameter of the finished head of the screw to be formed;

pin carrying means for carrying the pin toward and away from the upset end of the screw blank with the axis of the pin in substantial registry with the axis of the screw blank, the pin carrying means having a bore formed therethrough to receive the punch pin, the bore and punch pin being dimensioned to enable the pin to slide, and cant in the bore and to rotate freely within the bore and to enable the rear end of the pin to be impacted after the pin has been carried into engagement with the upset end of the blank;

the diameter of the bore, at least at its forward end, being smaller than the diameter of the upset end of the screw blank.

2. A finishing punch as defined in claim 1 further comprising:

means cooperative between the pin and the carrying means to urge the pin rearwardly away from the screw blank in response to rearward movement of the pin carrying means, the cooperative means being constructed and arranged to define a relatively small abutting area of a configuration which is symmetrically disposed about the axis of the pin.

3. A finishing punch as defined in claim 2 the means cooperative between the punch pin and the bore comprises:

the forward regions of each of the punch pin and the bore being of smaller diameter than the more rearward portions of the punch pin and the bore, the forward and rearward poritons of each of the former bore and the punch pin being joined at a shoulder region, the shoulder region on the pin being engageable with the shoulder region of the bore, the shoulder regions of the pin and the bore mating along a minimal surface area to minimize resistance to rotation of the pin when the shoulders are in engagement with each other.

4. A finishing punch as defined in claim 3 wherein each of the wings of the punch nib include a face defining a surface which lies at an angle to the axis of the punch to form in the finished recess, an undercut wall for each of the grooves formed by each of the wings.

5. A finishing punch as defined in claim 4 wherein the diameter of the punch pin, at its forward end, is approximately equal to the maximum diameter of the nib wings.

6. A finishing punch as defined in claim 1 wherein the punch pin at least at its nib, is harder than the forwardly facing surface of the pin carrying means.

7. In a heading machine having a die for holding a screw blank, a ram reciprocably movable toward and away from the die, the ram being constructed and arranged to carry a pair of punches including a first punch for forming an upset bloom and a second finishing punch, the ram being mounted to move the punches in sequence toward the die first to form the upset bloom and then to impact the upset end of the screw blank held in the die, an improved finishing punch for forming a head with a driver-engageable recess therein in the bloom of the upset blank comprising:
a punch pin
a punch pin carrier slidably mounted to the ram;
means biasing the carrier in a forward position in the ram;
impact means carried by the ram behind the punch pin carrier;
the punch pin carrier having a bore formed fully therethrough and being open at its forward and rearward ends, the forward end of the bore opening into the forward end of the carrier the forward end of the bore being smaller in diameter than the diameter defined by the upset bloom;
the punch pin being disposed within the carrier bore and having a recess forming nib at its forward end, the length of the pin as measured from its rear end to the tip of the nib being greater in length than the carrier bore by an amount at least equal to the intended depth of the recess to be formed, whereby when the ram is advanced forwardly toward the upset bloom, the impact means will engage the rear end of the pin to drive the pin into the upset bloom while the carrier is biased toward the die under the influence of the biasing means;
the rear end of the pin being of substantially smaller area than that circumscribed by the rear end of the carrier whereby the contact area between the impact means and the rear end of the pin may be minimal; and
the pin being loosely disposed within the carrier bore and being dimensioned with respect to the bore so that the pin may slide, rotate freely and cant within the bore.

8. A finishing punch as defined in claim 7 further comprising:
the pin, carrier, ram and impact means being constructed and arranged so that when the ram is in its fully forward position it will simultaneously engage the rear end of the pin and the pin carrier, the parts being dimensioned so that the engagement of the impact means with the pin carrier occurs substantially at the termination of the forward movement of the pin carrier ram whereby the screw head is caused to assume its final shape primarily in response to the impacting of the punch pin, the pin carrier being shaped as not to cause any significant cold blow shaping of the screw head.

9. A machine as defined in claim 7 further comprising;
the punch pin, impact means, pin carrier and ram being constructed and arranged so that the relative length between the pin and the carrier is such when the ram is in its most fully forward position, the impact means will remain spaced rearwardly of the rear surface of the carrier.

10. A machine as defined in claim 7 further comprising:
the punch pin, impact means, carrier and ram being constructed and arranged so that the impact means engages simultaneously the rear end of the pin and the rear end of the pin carrier slightly before the ram has reached its forwardmost position, the forward surface of the carrier being formed to define regions which are adapted to engage selected regions of the cold-formed screw head whereby slight continued forward movement of the ram to its forwardmost position may urge the forward surface of the carrier firmly against the selected regions of the formed screw head to impart a further finishing of the selected regions of the screw head without any substantial cold flow of metal.

11. In a heading machine having a die for holding a screw blank, a ram reciprocably movable toward and away from the die, the ram being constructed and arranged to carry an upset punch and a finishing punch successively toward the die to successively form the end of the screw blank held in the die by first forming an upset blank and then forming a finishing head with a driver receptive recess thereon, an improved punch combination for forming the head with the recess therein comprising:
the finishing punch including a punch pin having a main portion and having a recess forming nib at the end of the main portion, the recess forming nib including a plurality of wings extending generally radially from the axis of the pin, the main portion of the pin, at least at said end thereof, being of a diameter smaller than that of the screw head to be formed;
means mounting the punch pin to the ram for movement toward the upset bloom supported in the die to impact the nib into the upset bloom to simultaneously form the recess, reduce the upset bloom height to that of the finished screw head while causing outward radial cold flow of the metal of the upset bloom to enlarge the diameter of the bloom to that of the intended finished screw head, the finishing punch being substantially free of any other shaping members for forming the exterior shape of the screw head;
the upset punch being constructed and arranged to form the upset bloom to a selected predetermined configuration which will enable the metal of the upset bloom to cold-flow to the finished screw head shape solely in response to the impacting of the punch pin during operation of the finishing punch.

12. In a multiple-blow heading machine as defined in claim 11, the improvement comprising:
means responsive to movement of the ram away from the die for retaining the headed screw in the die and for urging the punch means away from the die and the headed screw to insure separation of the punch and the formed screw head.

13. In a heading machine as defined in claim 12 wherein the responsive means for insuring separtion of the punch means and the formed screw head comprises:
head engaging means mounted to the ram for movement therewith and being constructed and arranged to engage the formed screw head at least during the beginning of the movement of the ram away from the die;
the punch means being supported by the ram in a manner in which the punch will be urged rearwardly away from the die in response to rearward movement of the ram; and
means for maintaining the head engaging means in engagement with the head during the rearward urging of the punch.

14. A machine as defined in claim 13 wherein the responsive means to insure separation of the punch means and screw head further comprise:
the punch means including a punch pin;
the head engaging means comprising a punch pin carrier slidably mounted to the ram;

first means biasing the carrier in a forward position in the ram;

the carrier having a bore formed fully therethrough and being open at its forward and rearward ends, the punch pin being disposed within the carrier bore and having a length, as measured from its rear end to the tip of its nib, greater than that of the carrier bore by an amount at least equal to the intended depth of the recess to be formed;

second means biasing the punch pin rearwardly with respect to the carrier and under a force sufficient to overcome the force with which the nib of the punch may be embedded within the formed screw head whereby when the ram is urged readwardly, the carrier may remain biased forwardly toward the die to retain the screw with the die to enable the second biasing means to urge the pin out of the formed recess in response to relative movement of the ram rearwardly with respect to the forwardly biased carrier.

15. A finishing punch for cold forming a recessed head in a partially formed, upset end of a screw blank in a multiple-blow header machine comprising:

an elongate punch pin having a recess-forming nib at its forward end, the nib including a plurality of wings radiating therefrom for forming a similarly shaped multiple-groove, driver-receptive recess, the rear end of the punch pin defining an impact surface which is symmetrically disposed about the longitudinal axis of the pin, the impact surface defining an area not substantially greater than that defined by the diameter of the finished head of the screw to be formed;

pin carrying means for carrying the pin toward and away from the upset end of the screw blank with the axis of the pin in substantial registry with the axis of the screw blank, the pin carrying means having a bore formed therethrough to receive the punch pin, the bore and punch pin being dimensioned to enable the pin to slide and to rotate freely within the bore and to enable the rear end of the pin to be impacted after the pin has been carried into engagement with the upset end of the blank;

the bore, at least at its forward end, being smaller in diameter than that of the upset end of the screw blank to preclude entry of the upset end into the bore.

16. In a heading machine for cold forming a screw head having a recess formed therein, the improvement comprising, in combination:

first punch means for forming an upset bloom on an end of a screw blank;

second punch means including a punch member having a recess forming nib on the forward end thereof;

means for carrying the punch member so that is nib engages the upset bloom;

means for driving the punch member from its rear end along its axis and along the axis of the upset bloom to impact the nib of the punch into the upset bloom, the driving means including an impact member mounted to be driven against a small contact area at the rear end of the punch member and along the axis of the punch, the punch carrying means being constructed and arranged to enable the punch member to rotate and cant with respect thereto at least during the impacting of the nib to the upset bloom whereby the punch may be supported primarily at small contact areas at its opposite ends thereby to enable the nib to seek the path of least resistance through the metal of the bloom.

* * * * *